United States Patent
Zercher

(10) Patent No.: US 7,028,909 B2
(45) Date of Patent: Apr. 18, 2006

(54) LAMINATE TABBED POUCH IDENTIFICATION CARD WITH AN INTEGRATED CIRCUIT

(75) Inventor: John Michael Zercher, Columbia, PA (US)

(73) Assignee: GE Identicard Systems, Inc., Wilton, CT (US)

( * ) Notice: Subject to any disclaimer, the term of this patent is extended or adjusted under 35 U.S.C. 154(b) by 0 days.

(21) Appl. No.: 10/998,829

(22) Filed: Nov. 30, 2004

(65) Prior Publication Data

US 2006/0032907 A1    Feb. 16, 2006

Related U.S. Application Data

(60) Provisional application No. 60/601,138, filed on Aug. 13, 2004.

(51) Int. Cl.
G06K 19/02  (2006.01)
G06K 19/00  (2006.01)
G06K 19/06  (2006.01)

(52) U.S. Cl. .................. 235/488; 235/487; 235/492
(58) Field of Classification Search ............... 235/488, 235/487, 492
See application file for complete search history.

(56) References Cited

U.S. PATENT DOCUMENTS

| 4,855,583 A | 8/1989 | Fraser et al. | 235/492 |
| 5,893,960 A * | 4/1999 | Holt | 156/277 |
| 6,027,027 A | 2/2000 | Smithgall | 235/488 |
| 6,086,707 A * | 7/2000 | Waller | 156/277 |

* cited by examiner

*Primary Examiner*—Daniel Stcyr
*Assistant Examiner*—April A Taylor
(74) *Attorney, Agent, or Firm*—Baker & Hostetler LLP

(57) ABSTRACT

The present invention provides an identification device having an integrated circuit. The identification device has a first outer layer formed of a substrate. A second outer layer formed of a substrate having an antenna printed on an inner surface and an integrated circuit electrically connected to the antenna on the inner surface. The first and second outer layers are connected via a tabbed perforation.

20 Claims, 4 Drawing Sheets

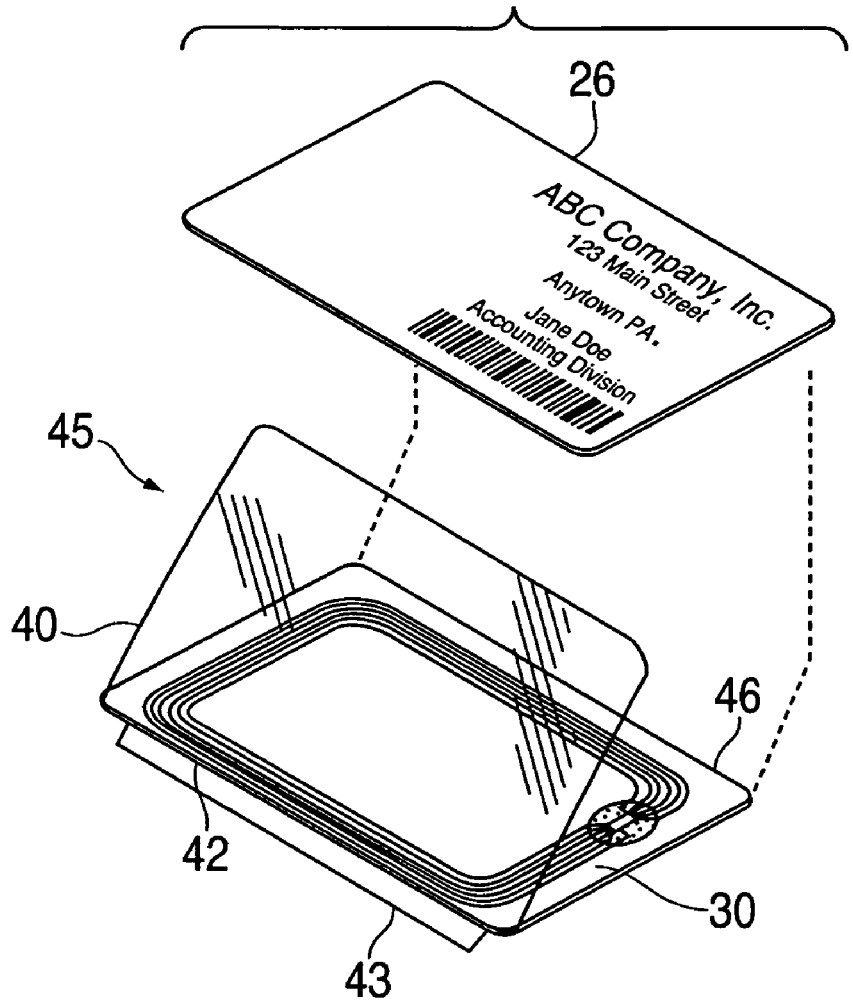

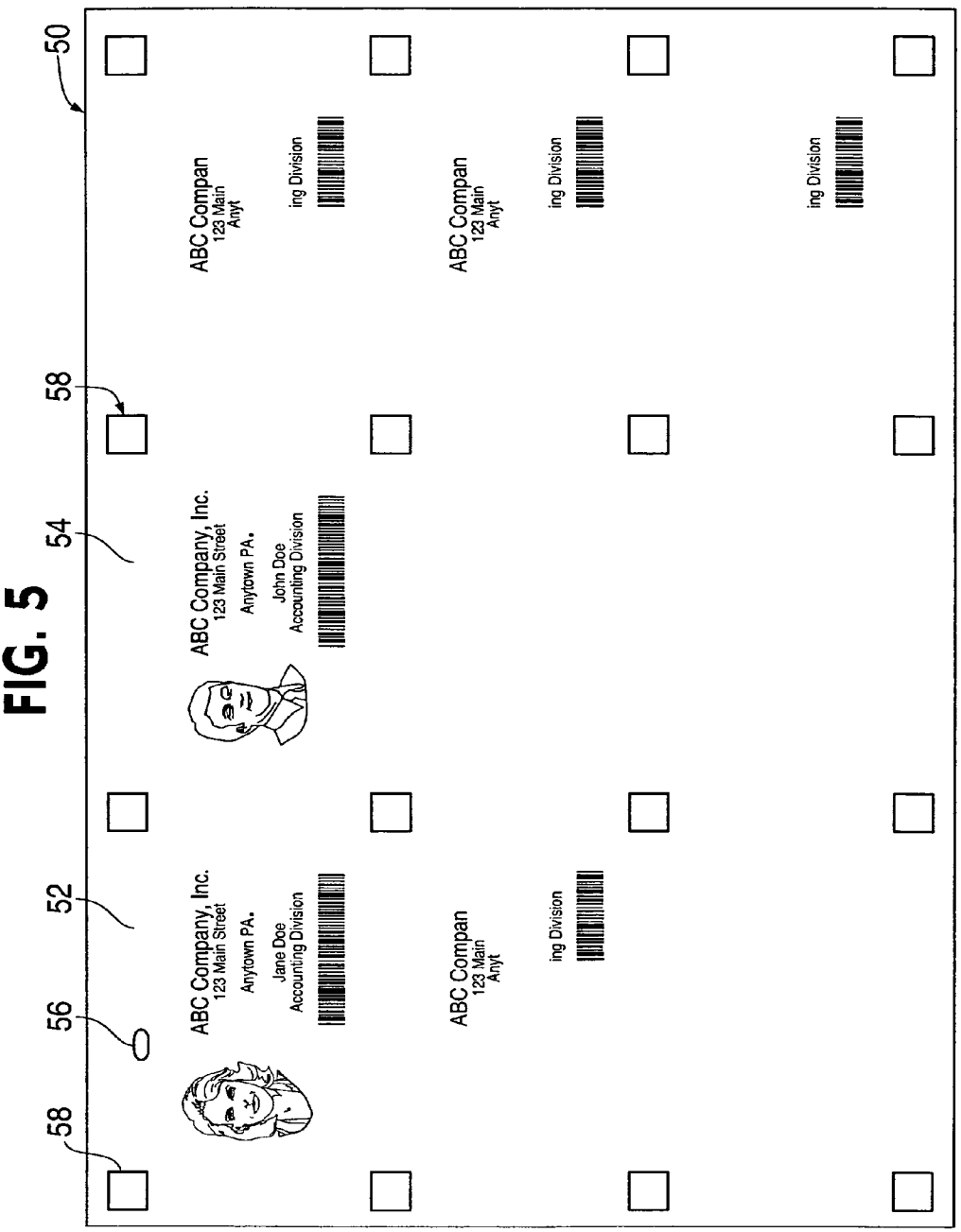

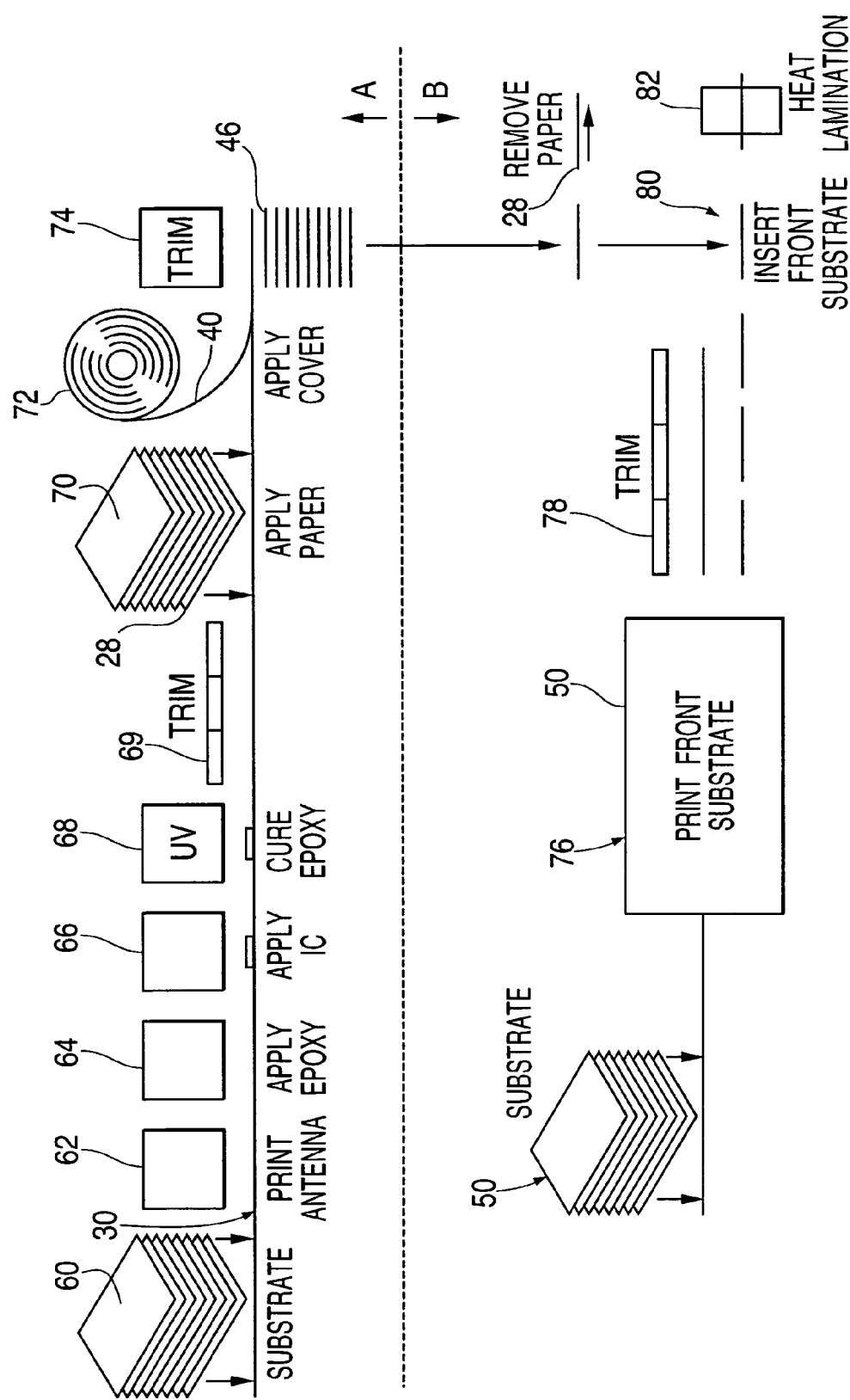

ലാMINATE TABBED POUCH IDENTIFICATION CARD WITH AN INTEGRATED CIRCUIT

CROSS-REFERENCE TO RELATED APPLICATIONS

This application claims priority to provisional U.S. patent application entitled, "A Laminate Tabbed Pouch Identification Card with an Integrated Circuit," filed Aug. 13, 2004 having a Ser. No. 60/601,138, the disclosure of which is hereby incorporated by reference in its entirety.

FIELD OF THE INVENTION

The present invention relates generally to devices containing information about a user. More particularly, the present invention relates to a tabbed identification device having an integrated circuit.

BACKGROUND OF THE INVENTION

Identification cards are being utilized in greater numbers for access control systems, tracking of personal data, at points of sale, and in many other applications. The identification cards typically contain information about a user or an object to which they are attached. For example, in access control systems an identification card may contain a user's name, employee number, and other employee specific information to allow the employee access to various locations within an employer's facilities. Within hospitals, such identification cards may contain patient specific data such as age, medical condition, allergies to medication, and other data utilized in treating and billing patients. Cards may also be of the form showing credentials and the like. Identification cards may consist of a multi-layer structure having one or more plastic layers surrounding integrated circuits which store the data. Data is transferred to and from the cards either through electrical contacts or radio frequency (RF) transmission. For RF transmission, contactless versions of these identification cards include an antenna for transmitting data to and from the integrated circuits.

One example of such an identification card is disclosed in U.S. Pat. No. 4,855,583. This patent teaches an identification card and method of making a multi-layer structure which has an outer layer of PVC material printed with information and/or a company logo. Another PVC layer having a window sized to receive a proximity electronic data storage device surrounds the storage device which contains an integrated circuit and the antenna. Another PVC layer may be provided with a window for containing a magnetic material which also has user specific data coded thereon. The various PVC layers and outer transparent films are secured to each other by the use of double sided contact adhesive materials dispersed between the layers. The cards may be fabricated in sheets containing a matrix of cards which is then cut into individual cards at the end of the process.

Several problems exist with such arrangements in that PVC is utilized for its rigidity in order to protect the antenna and integrated circuit from breaking upon flexure. Each layer of PVC must be of a prescribed thickness to surround and protect the components. In order to maintain the rigidity required and house the components necessary, these PVC cards tend to be relatively thick as compared to other types of cards such as a credit card. The resulting multi-layer structure is approximately 0.060 inches thick. Additionally, PVC tends to become brittle with age and exposure to ultraviolet rays. This contributes to card failure over time. Additionally, PVC is not an environmentally friendly material.

Another example of a simplified card is shown in U.S. Pat. No. 6,027,027. This patent discloses a luggage tag assembly which is formed by printing an antenna onto a substrate utilizing conductive ink. An integrated circuit chip is then applied to the antenna utilizing a curable epoxy. A top cover having printed information is adhesively applied either at the point of manufacture or at the point of service (POS) such as a luggage check-in counter. Although this design is thinner and more flexible than that of the '583 patent, it is not designed for long life. That is, it is designed to contain information for a luggage itinerary typically completed within one or two days. The assembly is not sealed from moisture or damage due to impact and repeated use.

Currently there is no method for a user to create a smart card with data on both sides of a card and have it encapsulated by a laminate film. There is also a problem of incorporating optional integrated tamper resistant security devices with the conventional wrapped method.

Identification cards having integrated circuit capabilities are being utilized in greater numbers for access control systems, the tracking of personal data, points of sale, and many other applications. The identification cards having integrated circuit capabilities typically consist of a multi-layer structure having one or more plastic layers surrounding integrated circuits that store data. The data is transferred to and from the identification cards either through electrical contacts or radio frequency (RF) transmission. For RF transmission, contactless versions of the identification cards include an antenna for transmitting the data to and from the integrated circuits. The identification cards having integrated circuit capabilities typically contain information about a user or an object to which they are attached. For example, in access control systems the identification card having integrated circuit capabilities may contain a user's name, employee number, and other employee specific information to allow the employee access to various locations within an employer's facilities. Within hospitals, such identification cards may contain patient specific data such as age, medical condition, allergies to medication, and other data utilized in treating and billing patients.

Accordingly, it is desirable to provide a method and apparatus that overcomes the above disadvantages and problems.

SUMMARY OF THE INVENTION

The foregoing needs are met, to a great extent, by the present invention, wherein in one aspect an apparatus is provided that in some embodiments provides an identification device having a laminate tabbed pouch with an integrated circuit connected to an antenna on an inner surface.

In accordance with one aspect of the present invention, a method of making an identification device subassembly is provided comprising the steps of applying a laminate on the front and back of a TESLIN strip; sealing the laminate on one side of the longitudinal axis of the strip; cutting the laminate and the strip into a card shape along the sealed longitudinal axis; printing data an inner piece of the TESLIN strip; and laminating the card shape.

In accordance with another aspect of the present invention, an identification device subassembly is provided comprising means for supplying a substrate to an antenna print station; means for printing the antenna on an inner surface of the substrate; means for applying an integrated circuit chip to the inner surface, the integrated circuit chip being in electrical contact with the antenna; means for forming a lamination pouch; and means for inserting the substrate and into the lamination pouch.

In accordance with still another aspect of the present invention, an identification device is provided comprising a first outer layer being formed of a substrate having printed material on an outer surface; a second outer layer being formed of a substrate having an antenna printed on an inner surface, and an integrated circuit being electrically connected to the antenna also on the inner surface; and an outer sleeve surrounding the outer layers and secured thereon by a lamination process along a longitudinal axis of the identification device.

Therefore, there is a need for an identification device which incorporates the use of a laminate tabbed pouch with an integrated circuit connected to an antenna on an inner surface.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is an exploded perspective view showing two layers of a subassembly and a third layer exploded out of the subassembly of the identification card of FIG. 1.

FIG. 5 is a matrix sheet of one of the layers of FIG. 4.

FIG. 6 is a diagrammatic view of the assembly process for the identification card.

DETAILED DESCRIPTION

Figure 1:
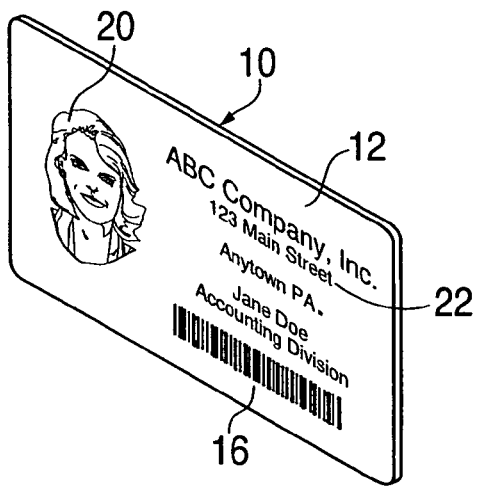
FIG. 1 shows a perspective front view of the identification card according to a preferred embodiment of the present invention.
Figure 2:
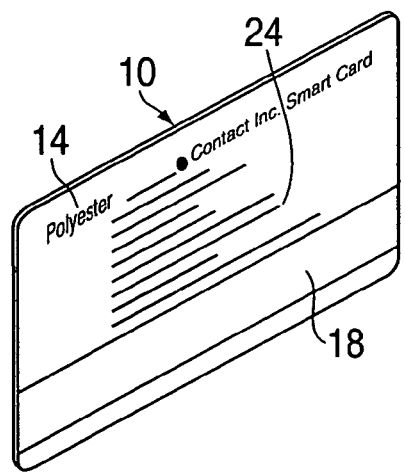
FIG. 2 shows a rear perspective view of the identification card of FIG. 1.

The invention will now be described with reference to the drawing figures, in which like reference numerals refer to like parts throughout. The invention will first be described generally with reference to FIGS. 1 and 2. The identification card 10 is a thin card having a front side 12 and a back side 14. The front side 12 may optionally have printed information 22 along with diagrammatic or photographic information 20. An optional bar code 16 may also be provided on the front side 12. Similarly, the back side 14 contains printed information 24 and a magnetic strip 18. It should be understood that while the bar code 16, graphic information 20 and printed information 22 are shown on the front side 12, this information may optionally be placed on the back side 14 or eliminated. Similarly, the elements of the back side 14 may be placed on the front side 12. Inside the identification card 10 are a plurality of layers which may contain an integrated circuit for storing additional user specific information, an antenna for transmitting data between the integrated circuit and another device, or contacts for transmitting data between the identification card 10 and another device.

Figure 3:
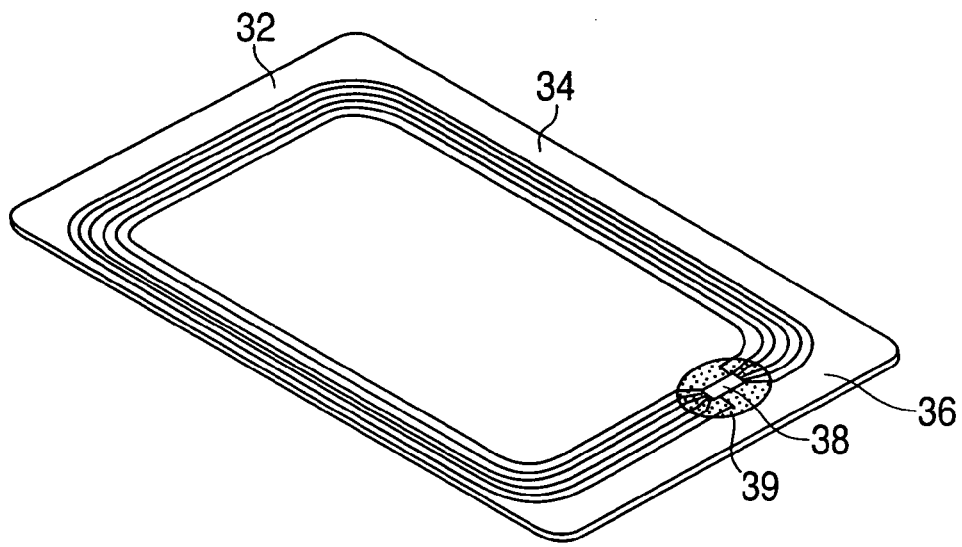
FIG. 3 shows a perspective view of an inner surface of one of the layers inside the identification card of FIG. 1.

Each of the major components of the identification card 10 will now be described in greater detail with reference to FIGS. 3 and 4. Referring first to FIG. 4, the identification card 10 is constructed from a plurality of layers 26, 30 and an outer sleeve 40. A first outer layer 26 is a substrate formed of a plastic material preferably TESLIN which is manufactured by PPG Industries of Pittsburgh, Pa. and herein incorporated by reference. It should be understood, however, that other suitable materials which are capable of receiving printed material may be utilized. The outer surface of the first outer layer 26 may have printed information 22 and an optional bar code 16. These are applied utilizing a standard ink jet or other printer.

The second outer layer 30 is formed of a substrate preferably TESLIN. Once again, it should be understood that any suitable thin material capable of receiving a printed antenna may be utilized for the substrate. Printed on an inner surface of the second outer layer 30 is an antenna 34 and a plurality of positioning marks 36. This inner surface is best shown in FIG. 3. The antenna 34 consists of a plurality of loops extending from an area near the positioning marks 36. An integrated circuit 38 is preferably fixed to the inner surface utilizing a curable epoxy as is well known in Flip Chip technology. The integrated circuit 38 is positioned to contact opposite ends of the antenna loops and is held in place by an epoxy 39. The outer surface of this second outer layer 30 may optionally have printed information 24 which forms the back side 14 of the identification card 10.

Referring again to FIG. 4, a sleeve 40 is formed of a clear laminate material and surrounds the outer layers 26, 30. The sleeve 40 has a hinged perforated end 42 proximal a tabbed end 43. The outer layers 26, 30 fit into the hinged perforated end 42. An optional magnetic strip 18 may be provided along a surface of the sleeve 40.

The process of producing the present invention may be to take a strips 26, 30 of TESLIN, or other suitable material, and apply a laminate on the front and back of the strips. This laminate may be heated and sealed approximately ⅛ inch on one side of the longitudinal axis of the strips 26, 30 of TESLIN. The strips 26, 30 may then be die cut into a card shape with perforations 42 along the sealed axis. This process will allow printed material to be placed on the inner piece of TESLIN. The resulting card pouch 45 is then placed into a full card laminator and sealed together. The perforated tab 43 is then removed to create a finished card.

A method of making the identification card 10 will now be described in greater detail with reference to FIG. 6. Referring first to FIG. 5, a matrix 50 formed on a substrate which eventually forms the first outer layer 26 of each card 10 is shown. The matrix 50 has printed text on one surface. The printed text is grouped in individual card sections 52, 54. Also included are, positioning marks 56 which can be detected later in the process for positioning the matrix 50 within other printing or cutting equipment. Border marks 58 are provided surrounding each individual card section 52, 54. Included in the text information in each individual card section 52, 54 are a photograph, text material, and a bar code. It should be understood by those reasonably skilled in the art however, that any printed information may be placed on this side of the matrix 50. That information may or may not include, the photo, the text, or the bar code and also may include other information such as, numerical codes, or magnetic printed information which is specific to a user or an object.

The first outer layer 26 is manufactured by printing information as described above onto the matrix 50 at a printing station 76 as shown in FIG. 6 in the second portion labeled "B." It should be understood that the preferred material, TESLIN, will receive this printing utilizing standard printer equipment such as an ink jet or laser jet printer. The matrix is then trimmed at a trimming station 78 in a two step process. First, the matrix is trimmed into strips and then the strips are cut into individual first layers 26 for assembly into the identification card 10 as will be described below.

Referring again to FIG. 6, assembly of the second outer layer 30 will now be described in greater detail. In the first portion "A" of the process, a substrate is supplied in sheets 60 which are fed first through a foil antenna stamp station 62 where the foil antenna 34 is applied utilizing foil stamping equipment. Each substrate is then fed to an epoxy application station 64 where epoxy 39 is applied in the area which will receive the integrated circuit chip 38. Next, the substrate is fed through an integrated circuit application station 66 where the IC chip 38 is applied over the epoxy and is positioned to be in contact with the foil antenna 34. The substrate continues along to an epoxy curing station 68 where the previously applied epoxy is cured to secure the IC chip 38 in place. Next, the substrate passes a trim station 69 wherein the matrix is cut into one dimensional arrays of strips. For example, a three by three matrix having foil antennas 34 stamp thereon may be cut into three separate one by three arrays of strips wherein each strip contains three foil antennas 34 arranged in a single row.

Next, the substrate then passes a cover application station 72 where the sleeve 40 is applied over layer 30 such that they are maintained in the hinge perforated end 42 of the sleeve 40. Once the sleeve 40 is applied to the strip, it passes through a second trim station 74 where the strip is cut into individual subassemblies 46. Each individual subassembly 46 at this stage contains a sleeve 40 surrounding the layer 30 as shown in FIG. 4 along with perforated tab 43 connected layer 30 to sleeve 40.

To complete the final assembly, the trimmed first layers 26 from the second portion "B" of the process as described above are individually inserted into the subassemblies 46 at insertion step 80. The subassembly 46 having the first layer 26 inserted is then laminated at the lamination step 82 utilizing standard lamination equipment. It should be understood by those reasonably skilled in the art that the first portion "A" of the assembly process in FIG. 6 can be completed at a card manufacturer's location while the second portion "B" of the assembly process may be completed at a point of service or a customer location where identification cards are used as shown in FIG. 6. Since the second portion "B" of the process only requires standard printing equipment, substrate material maybe supplied to the customer and the customer may then print, insert and laminate the first layer 26 to the subassembly 46. Optionally, the entire process including both portions "A" and "B", may be completed at card manufacturer's location according to customer specifications. In this case since there is no risk of the foil antenna bleeding, the second outer layer 26 will be applied before the sleeve 40. Where the second portion of the process "B" is conducted at the point of service or customer location, the customer has ultimate flexibility in selecting what material is printed on the substrate 50. Additionally, no specialized equipment is required to conduct the printing and trimming operations at the point of service.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of making an identification device subassembly comprising:
    applying a laminate on the front and back of a TESLIN strip;
    sealing said laminate on one side of a longitudinal axis of said TESLIN strip;
    cutting said laminate and said TESLIN strip into a card shape along the sealed longitudinal axis;
    creating perforations along the sealed longitudinal axis;
    applying data onto an inner piece of the TESLIN strip through the perforations; and
    laminating said card shape.

2. An identification device comprising:
    a first outer layer being formed of a substrate having printed material on an outer surface;
    a second outer layer being formed of a substrate having an antenna printed on an inner surface, and an integrated circuit being electrically connected to the antenna also on the inner surface; and
    an outer sleeve surrounding the outer layers and secured thereon by a lamination process along a longitudinal axis of the identification device; and
    a plurality of perforation locations near the longitudinal axis.

3. The identification device of claim 2, wherein the first outer layer and the inner layer are positioned into the outer sleeve to form an assembly prior to the lamination process.

4. The identification device of claim 3, wherein the first outer layer and the second outer layer are laminated.

5. The identification device of claim 2, wherein the first outer layer substrate is formed from TESLIN.

6. The identification device of claim 2, wherein the second outer layer substrate is formed from TESLIN.

7. An identification device subassembly comprising:
    an inner layer formed of TESLIN material having an antenna printed on an inner surface and an integrated circuit chip also on the inner surface in an electrical communication with the antenna; and
    an outer sleeve having a perforated end, the outer sleeve is configured to permit an insertion of printed material through a perforated end such that the printed material is located on the inner layer.

8. A method of making an identification device subassembly comprising the steps of:
   supplying a substrate to an antenna print station;
   printing an antenna on an inner surface of a substrate;
   applying an integrated circuit chip to the inner surface, the integrated circuit chip being in electrical contact with the antenna;
   forming an access with a plurality of perforations along a longitudinal axis of the substrate; and
   inserting the substrate into a lamination pouch.

9. The method of claim 8, wherein the substrate is applied to the antenna printing station in a sheet.

10. The method of claim 9, wherein the substrate sheets are trimmed after application of the integrated circuit chip to the antenna.

11. The method of claim 8, further comprising the steps of inserting a second outer layer.

12. The method of claim 11, wherein the subassembly is laminated.

13. An identification device subassembly comprising:
   means for supplying a substrate to an antenna print station;
   means for printing the antenna on an inner surface of the substrate;
   means for applying an integrated circuit chip to the inner surface, the integrated circuit chip being in electrical contact with the antenna;
   means for forming an access along a longitudinal axis of the substrate; and
   means for inserting the substrate into a lamination pouch.

14. The identification card subassembly of claim 13, wherein the substrate is applied to the antenna print station in a sheet.

15. The identification card subassembly of claim 14, wherein the substrate sheets are trimmed after application of the integrated circuit chip to the antenna.

16. The identification card subassembly of claim 13, further comprising means for inserting a second outer layer.

17. The identification card subassembly of claim 15, wherein the subassembly is laminated.

18. The identification card subassembly of claim 13, wherein the means for printing is a printing device.

19. The identification card subassembly of claim 13, wherein the means for applying an integrated circuit chip is an epoxy device.

20. The identification card subassembly of claim 13, wherein the means for printing an antenna is a conductive ink printing device.

* * * * *

UNITED STATES PATENT AND TRADEMARK OFFICE
CERTIFICATE OF CORRECTION

| | | |
|---|---|---|
| PATENT NO. | : 7,028,909 B2 | Page 1 of 1 |
| APPLICATION NO. | : 10/998829 | |
| DATED | : April 18, 2006 | |
| INVENTOR(S) | : John Michael Zercher | |

It is certified that error appears in the above-identified patent and that said Letters Patent is hereby corrected as shown below:

Column 7, line 16, delete "the steps of."

Signed and Sealed this

Eleventh Day of July, 2006

JON W. DUDAS
*Director of the United States Patent and Trademark Office*